United States Patent Office 3,455,989
Patented July 15, 1969

3,455,989
CARBONYLATION OF OLEFINICALLY OR ACETY-LENICALLY UNSATURATED COMPOUNDS
Nikolaus von Kutepow, Karlsruhe, Knut Bittler and Dieter Neubauer, Ludwigshafen (Rhine), and Hermann Reis, Limburgerhof, Pfalz, Germany, assignors to Badische Anilin- & Soda-Fabrik Aktiengesellschaft, Ludwigshafen (Rhine), Germany
No Drawing. Filed Dec. 14, 1965, Ser. No. 513,849
Claims priority, application Germany, Dec. 19, 1964, B 79,819
Int. Cl. C07c 51/14, 67/04, 51/58
U.S. Cl. 260—468                5 Claims

ABSTRACT OF THE DISCLOSURE

Carbonylation of olefinically or acetylenically unsaturated hydrocarbons to form carboxylic acids, esters or halides by means of a palladium catalyst wherein the residue of the reaction containing the catalyst as obtained by distillation and/or extraction of the reaction mixture with an aqueous alkaline solution is treated with an organic phosphine before reusing the catalyst in a subsequent carbonylation reaction.

---

This invention relates to an improved process for carbonylating olefinically or acetylenically unsaturated compounds using a catalyst which has already been used and reactivated.

A prior art method for the production of carboxylic acids or carboxylic esters consists in reacting olefinically unsaturated compounds with carbon monoxide and water or an alcohol or a phenol in the presence of a palladium catalyst having the formula $L_mPdX_n$ in which L denotes an organic phosphine, ammonia or an amine, a nitrile or an unsaturated hydrocarbon, and X denotes a monovalent radical of an organic or inorganic acid, while $m$ and $n$ each denotes one of the integers 1 and 2 and the sum of $m+n$ is equal to 3 or 4. The process is carried out at 20° to 250° C., particularly 30° to 170° C. and a pressure of 25 to 1000 atmospheres, preferably 75 to 1000 atmospheres. Preferred olefinically unsaturated compounds are hydrocarbons having two to twenty carbon atoms and one to four double bonds. They may have an acetylene bond in conjugation to a double bond and they may also contain an aromatic structure. Preferred alcohols are alkanols, alkanediols, cycloalkanols and aralkanols having up to twenty carbon atoms. Preferred phenols are those having six to ten carbon atoms and 1 to 2 hydroxyl groups. The best results are achieved with catalysts in which L denotes an organic phosphine.

In another method for the production of carboxylic acids or carboxylic esters, olefinically unsaturated compounds are reacted with carbon monoxide and water or alcohols or phenols at elevated temperature and advantageously under superatmospheric pressure in the presence of palladium metal or a palladium chalcogenide, an acid and an organic phosphine or nitrile. It is advantageous to use a temperature of from 30° to 180° C. and a pressure of 25 to 1000 atmospheres. Preferred olefinically unsaturated compounds have two to twenty carbon atoms, 1 to 4 double bonds and hydrocarbon structure, and may contain aromatic nuclei. Preferred alcohols and phenols have one or two hydroxyl groups, up to twenty carbon atoms and, apart from the hydroxyl groups, hydrocarbon structure without olefinic or acetylenic bonds. The best results are obtained with phosphines which contain at least one aromatic radical, particularly with triarylphosphines, but also with tricycloalkylphosphines, in each case with eighteen to thirty carbon atoms. Other suitable phosphines are for example trialkylphosphines having three to thirty carbon atoms. Suitable nitriles have two to twenty carbon atoms, one or two nitrile groups and, apart from these, saturated hydrocarbon structure, possibly including aromatic nuclei. Strong or medium strength acids, particularly hydrogen halides, are preferred as acids.

Another carbonylation method yields carboxylic halides by reaction of olefinically or acetylenically unsaturated compounds with carbon monoxide and a hydrogen halide at elevated temperature and under superatmospheric pressure. The above mentioned compounds having the formula $L_mPdX_n$ serve as catalysts and L is preferably an organic phosphine or a nitrile. Instead of these compounds, palladium metal or a palladium chalcogenide, an acid and an organic phosphine or a nitrile can be employed as is the case in the above mentioned method for the production of carboxylic acids or carboxylic esters. It is usual to employ temperatures of from 30° to 200° C., preferably from 50° to 120° C., and pressures of 5 to 700 atmospheres, preferably 50 to 300 atmospheres. Preferred olefinically unsaturated starting materials have up to twelve carbon atoms, up to four double bonds and hydrocarbon structure. Preferred acetylenically unsaturated starting materials (which give olefinically unsaturated carboxylic halides, saturated $\beta$-halocarboxylic halides or saturated dicarboxylic halides) have up to sixteen carbon atoms, one or two acetylenic triple bonds and hydrocarbon structure. Hydrogen chloride and hydrogen bromide are the preferred hydrogen halides.

All the said carbonylation methods may be carried out in the presence of inert solvents, for example hydrocarbons or chlorohydrocarbons.

In the said methods it is important for economical reasons to regenerate the palladium catalyst. After the reaction, and probably also during the reaction, it is in solution even when a start is made with palladium metal or a palladium compound which per se is insoluble. The reaction fixture is in general worked up by distillation. Particularly in the production of higher carboxylic acids it is sometimes advantageous to remove the acid constituents of the reaction mixture previously by extraction by means of solutions of alkaline reacting substances because this will prolong the life of the catalyst. In both cases the catalyst remains in the distillation or extraction residue and may be used again. It has been found that the activity of this already used catalyst declines relatively rapidly when reused, even if the palladium content per se is adequate.

It is the primary object of this invention to provide methods for the production of carboxylic acids, carboxylic esters or carboxylic halides by reaction of olefinically unsaturated compounds with carbon monoxide and water or alcohols or phenols or hydrogen halides or by reaction of acetylenically unsaturated compounds with carbon monoxide and hydrogen halides using palladium catalysts, in which the catalyst may be used in a simple way and with practically undiminished activity for further reactions. Other objects of the invention will be apparent from the following description.

We have found that carboxylic acids, carboxylic esters or carboxylic halides may be advantageously prepared by reaction of olefinically or acetylenically unsaturated compounds with carbon monoxide and with water or with an alcohol, phenol or hydrogen halide in the presence of a catalytically active palladium compound when the used catalyst is reused in a solution which has been obtained as a residue in the working up of the reaction mixture by distillation and/or extraction of the acid constituents by means of solutions of alkaline reacting substances, and when a small amount of an organic phosphine is added to this catalyst solution.

The process according to the invention makes possible a particularly economical operation of the said prior art methods. In the working up of the reaction mixture by distillation, the catalysts are in general obtained dissolved in a residue which has an oily or viscous consistency and constitutes about 0.1 to 40% by weight of the reaction mixture. It is advantageous to ensure that during the distillation the catalyst is heated at temperatures above 250° C. at the most for only a short time or not at all. If the reaction product contains carboxylic acids, particularly high boiling point carboxylic acids, i.e., those having more than six carbon atoms, it is advantageous to separate these acid constituents by extraction with an aqueous solution or suspension of a hydroxide, carbonate or hydrogen carbonate of an alkali metal or alkaline earth metal. The catalyst is contained in the extraction residue. It may be reused as it arises or after removing volatile constituents.

The best results are achieved with phosphines which contain at least one aromatic radical, particularly with triarylphosphines or tricycloalkylphosphines. Suitable triarylphosphines or tricycloalkylphosphines may have for example eighteen to thirty carbon atoms. Trialkylphosphines having three to thirty carbon atoms are also suitable. Examples of specific phosphines are: triphenylphosphine, tri-o-cresylphosphine, tri-p-methoxyphenylphosphine, tributylphosphine, diphenylmethylphosphine and phenyldibutylphosphine. It is not necessary to add the same complex forming compound as has been present in the original catalyst. For example a phosphine may be added for reuse to a catalyst which contained a nitrile as complex forming compound. The most favorable amount of complex forming compound may easily be determined by experiment. In general 0.1 to 20 moles of phosphine is used per gram atom of palladium.

Adding a complex forming compound naturally will not have any effect when the concentration of palladium has become too low owing to losses during working up. In this case it is necessary to add further palladium.

The process according to this invention does not differ from the above mentioned prior art methods as regards temperature, pressure, use of solvents and the other reaction conditions. When working continuously, it is recommendable that the residue containing the catalyst should be introduced into the reaction in admixture with one of the starting materials.

The invention is further illustrated by the following examples in which parts are by weight, unless otherwise specified. Parts by weight bear the same relation to parts by volume as the gram to the cubic centimeter.

Example 1

0.1 part of bis-triphenylphosphine-palladium chloride, 120 parts of cyclododecatriene-(1,5,9) and 45 parts by volume of ethanol containing hydrogen chloride and having the acid number 50 are placed in an autoclave having a capacity of 800 parts by volume. The autoclave is flushed out with nitrogen and then 200 atmospheres of cold carbon monoxide is forced in. The autoclave is set in rotation and heated to 75° C. After this temperature has been reached, more carbon monoxide is forced in until the pressure is 300 atmospheres gauge. This pressure and the said temperature are maintained for four hours. The alcohol is removed under subatmospheric pressure from the cold reaction mixture. The reaction product is then separated from the residue in a film evaporator. A residue remains which contains the catalyst.

The residue is mixed with 120 parts of cyclododecatriene-(1,5,9) and 45 parts by volume of ethanol containing hydrogen chloride and used as catalyst for a fresh batch, in one case (Table I) without adding any phosphine and in another case (Table II) after having added triphenylphosphine.

The results are given in the following tables in which:

the first column indicates the initial reaction and the first, second and third reuse of the catalyst;
RM=amount of reaction mixture in parts;
C=amount of catalyst [$(C_6H_5)_3P]_2PdCl_2$ used
Y=yield in parts of cyclododecadiene-(5,9)-carboxylic-(1)-ethyl ester
R=amount in parts of the residue containing catalyst
P=amount of triphenylphosphine added.

TABLE I.—WITHOUT ADDING TRIPHENYLPHOSPHINE

| Reaction | RM | C | Y | R |
| --- | --- | --- | --- | --- |
| Initial | 169 | 0.1 | 50 | 35 |
| 1st reuse | 176.5 | | 13 | 25 |
| 2nd reuse | 179 | | 23 | 26 |
| 3rd reuse | 179 | | 6 | 17 |

TABLE II.—ADDING TRIPHENYLPHOSPHINE

| Reaction | RM | C | P | Y | R |
| --- | --- | --- | --- | --- | --- |
| Initial | 159 | 0.1 | | 45 | 40.7 |
| 1st reuse | 197.5 | | 0.0746 | 54 | 26.8 |
| 2nd reuse | 186.5 | | 0.0746 | 54 | 27.3 |
| 3rd reuse | 188.5 | | 0.0746 | 49 | 24.7 |

Example 2

The procedure of Example 1 is followed, but instead of ethanol containing hydrogen chloride, the same amount of methanol containing hydrogen chloride and having the acid number 25 is used. The reaction temperature is 85° C.

By reusing the residue containing the catalyst four times together with 0.1 part of triphenylphosphine, 210.8 parts of cyclododecadiene-(5,9)-carboxylic acid-(1)-methyl ester is obtained in all. The individual experiments give the following yields:

| | Parts |
| --- | --- |
| Initial reaction | 47.3 |
| 1st reuse | 39.5 |
| 2nd reuse | 42.0 |
| 3rd reuse | 39.3 |
| 4th reuse | 42.7 |

If the experiments are repeated without adding triphenylphosphine, a similar result is obtained only in the initial reaction:

| | Parts |
| --- | --- |
| Initial reaction | 45.2 |
| 1st reuse | 21.0 |
| 2nd reuse | 9.5 |
| 3rd reuse | --- |

Example 3

An autoclave having a capacity of 800 parts by volume is charged with 60 parts by volume of propionyl chloride and 0.2 part by weight of bistriphenylphosphine palladium-(II)-dichloride, closed, flushed with nitrogen and pressured with 50 parts by weight of hydrogen chloride. Then a 1:1 ethylene/carbon monoxide mixture is pumped in until the pressure is 300 atmospheres. The autoclave is set in rotation, heated to 110° C. and maintained at an overall pressure of 700 atmospheres for four hours by forcing in more ethylene/carbon monoxide mixture every hour. The reaction mixture is distilled at normal pressure over an efficient column and gives 3.5 parts of first runnings and 85.4 parts of propionyl chloride. The distillation residue weighs 28 parts.

The experiment is repeated several times, but instead of bistriphenylphosphine palladium-(II)-dichloride each time the distillation residue from the preceding experiment is used to which 0.2 part of triphhenylphosphine has been added. The results may be seen from the following table in which:

the first column indicates the initial reaction and the first to fifth reuse;
IC=amount of propionyl chloride initially charged to the reactor in parts by volume;

HCl=amount of hydrogen chloride pumped in in parts by weight;
GA=total amount of gas absorbed in atmospheres;
RM=amount of reaction mixture in parts by weight;
DIST=amount of propionyl chloride obtained by distillation in parts by weight.

TABLE III

| Reaction | IC | HCl | GA | RM | DIST |
|---|---|---|---|---|---|
| Initial | 60 | 50 | 310 | 124 | 85 |
| 1st reuse | 30 | 120 | 480 | 284 | 208 |
| 2nd reuse | 30 | 100 | 680 | 368 | 242 |
| 3rd reuse | 30 | 120 | 920 | 499 | 304 |
| 4th reuse | 20 | 120 | 570 | 357 | 197 |
| 5th reuse | 20 | 70 | 580 | 348 | 168 |
| | 190 | | | | 1,204 |

By deduction the total amount of propionyl chloride initially charged to the autoclave (190 parts by volume =202 parts by weight) from the amount obtained by distillation (1204 parts by weight), the amount of propionyl chloride newly formed by carbonylation using 0.2 part by weight of catalyst is obtained (1002 parts by weight). In addition, 69 parts of first runnings is obtained in all, which for the most part consist of propionyl chloride.

Example 4

The glass insert of an autoclave is charged with 0.1 part of bistriphenylphosphine palladium-(II)-dichloride, 30 parts of cis-trans-trans-cyclododecatriene-(1,5,9) and 120 parts by volume of 18% aqueous hydrochloric acid. The autoclave is swept with nitrogen and 200 atmospheres of carbon monoxide is forced in, whereupon it is set in rotation and heated to 80° C. internal temperature. Then carbon monoxide is pumped in until the pressure is 300 atmospheres and these reaction conditions are maintained for four hours. After cooling and releasing the pressure, 154 parts of reaction mixture is obtained.

The reaction mixture is carefully extracted with excess sodium carbonate solution and the organic phase separated. The latter is used for further experiments carried out with and without the addition of phosphine.

The sodium carbonate extraction is extracted once with petroleum ether. The petroleum ether layer is discarded, while the aqueous layer is acidified with hydrochloric acid, extracted with ether and then also discarded. The ethereal extract is dried with calcium chloride, filtered and freed from ether in vacuo. 13.2 parts of a resinous residue remains which slowly crystallizes. Analysis of the residue gives similar values to those calculated for cyclododecadiene-(5,9)-carboxylic acid-(1):

| | Percent | | | Molecular weight | Acid number | Hydrogenation iodine number |
|---|---|---|---|---|---|---|
| | C | H | O | | | |
| Found | 73.8 | 10.2 | 16.6 | 194 | 279 | 222 |
| Calculated | 74.8 | 9.6 | 15.4 | 208 | 268 | 243 |

The experiment is repeated, but the organic phase of the sodium carbonate extraction is used instead of catalyst in such an amount that the organic phase is made up to 30 parts (17 parts of organic phase and 13 parts of cyclododecatriene). 14.2 parts of carboxylic acid and 12 parts of the organic phase from the sodium carbonate extraction are obtained.

If the extraction residue is used yet another time, only 1 part of carboxylic acid is obtained and elementary palladium separates in the crude reaction mixture.

By repeating the experiments in the manner described but adding 0.2 part of triphenylphosphine to the residue from the sodium carbonate extraction prior to each reuse the following results are obtained:

Initial reaction: 12.5 parts of carboxylic acid; 18.1 parts of organic phase from the sodium carbonate extraction
1st reuse: 10.1 parts of carboxylic acid; 16.2 parts of extraction residue
2nd reuse: 12.2 parts of carboxylic acid; 15.9 parts of extraction residue The crude reaction mixtures contain no or practically no elementary palladium.

Example 5

The procedure of Example 1 is followed, but 0.112 part of bistritolylphosphine palladium dichloride is used as catalyst. When reusing the distillation residue, tritolylphosphine is added instead of triphenylphosphine. The results are given in the following Table IV in which:

the first column indicates the initial reaction and the first, second and third reuse of the catalyst;
RM=amount of reaction mixture in parts
C=amount of catalyst $[(C_7H_7)_3P]_2PdCl_2$ used in parts
P=amount of tritolylphosphine added in parts
Y=yield in parts of cyclododecadiene-(5,9)-carboxylic acid-(1)-ethyl ester
R=amount of distillation residue containing catalyst in parts

TABLE IV

| Reaction | RM | C | P | Y | R |
|---|---|---|---|---|---|
| Initial | 163 | 0.112 | | 48 | 38 |
| 1st reuse | 185 | | 0.085 | 51.5 | 24 |
| 2nd reuse | 187.5 | | 0.085 | 53 | 28 |
| 3rd reuse | 187 | | 0.085 | 48 | 26 |

Example 6

1 part of a supported catalyst containing 5% of palladium, 30 parts of 12% aqueous hydrochloric acid and 1 part of triphenylphosphine are charged to the glass insert, swept with nitrogen, of an autoclave having a capacity of 800 parts by volume. The autoclave is closed and 150 atmospheres of a cold ethylene-carbon monoxide mixture (50:50) is pumped in, whereupon the autoclave is heated to 140° C. and more ethylene-carbon monoxide mixture is forced in until the pressure is 300 atmospheres gauge. The said reaction temperature is maintained for six hours, the pressure drop being 150 atmospheres. The reaction mixture is 109 parts which is subjected to distillation. 41 parts of first runnings boiling between 58° and 138° C. and 41 parts of propionic acid boiling at 138° C. to 141° C. are obtained. 27 parts of residue remains in the flask.

By reusing the residue obtained in the said distillation together with 1 part of triphenylphosphine, 30 parts of 12% aqueous hydrochloric acid and 30 parts of first runnings from the said distillation under the conditions described, 171 parts of reaction mixture is obtained with a pressure drop of 200 atmospheres. On distillation, this gives 41 parts of first runnings boiling between 115° and 138° C., 104 parts of propionic acid and 20 parts of residue.

By repeating this experiment, 166 parts of reaction mixture is obtained with a pressure drop of 100 atmospheres. On distillation, 28 parts of first runnings boiling between 100° and 138° C., 106 parts of propionic acid boiling between 138° C. and 141° C. and 23 parts of residue are obtained.

By following the above procedure but omitting triphenylphosphine, only a fraction boiling between 100° and 108° C. is obtained even at a pressure of 700 atmospheres, no propionic acid being formed.

It will be understood that the above examples and description of the present invention are merely illustrative and not limitative. Rather the invention will be used wherever a dissolved palladium catalyst originating from a carbonylation reaction which is to be reused for such a reaction is mixed with an organic phosphine prior to or during such reuse. This is true also when the catalyst is a simple palladium salt, such as $PdCl_2$, or a chelate complex, such as palladium acetylacetonate, or when additives, such as a germanium or tin salt, have been used.

We claim:
1. In a process for the carbonylation of an unsaturated compound selected from the class consisting of ethylenically and acetylenically unsaturated hydrocarbons to form carboxylic halides by reacting said unsaturated compound with carbon monoxide and a hydrogen halide or to form carboxylic acids or esters by reacting said ethylenically unsaturated hydrocarbon with carbon monoxide, a hydrogen halide and a member selected from the class consisting of water, alcohols and phenols, each reaction being carried out in the presence of a palladium catalyst, the improvement which comprises: recovering the reaction products from said carbonylation by at least one of the steps of distillation and extraction of the reaction mixture with an aqueous alkaline solution; adding to the residue of at least one of said distillation and extraction steps which contains the catalyst about 0.1 to 20 moles per gram atom of palladium of an organic phosphine selected from the class consisting of triarylphosphines of eighteen to thirty carbon atoms, tricycloalkylphosphines of eighteen to thirty carbon atoms, trialkylphosphines of three to thirty carbon atoms, diarylmonoalkylphosphines of thirteen to thirty carbon atoms and dialkyl-monoaryl phosphines of eight to thirty carbon atoms; and reusing said catalyst-containing residue with the added organic phosphine in a subsequent carbonylation reaction of said unsaturated compound.

2. An improved process as set forth in claim 1 wherein the reaction mixture is heated at the most for a short time at a temperature above 250° C. during working up.

3. An improved process as set forth in claim 1 wherein an organic phosphine is used which contains at least one aromatic radical.

4. An improved process as set forth in claim 1 wherein a triarylphosphine having eighteen to thirty carbon atoms is used.

5. An improved process as set forth in claim 1 wherein a trialkylphosphine having three to thirty carbon atoms is used.

References Cited
UNITED STATES PATENTS 3,168,553   2/1965   Slaugh _____ 260—514 XR

OTHER REFERENCES

Tsuji, "Tetrahedron Letters," No. 22, pp. 1437–1440 (1963).

LORRAINE A. WEINBERGER, Primary Examiner

PAUL J. KILLOS, Assistant Examiner

U.S. Cl. X.R.

260—479, 497, 514, 533, 544